US012574982B2

(12) United States Patent
Inohiza

(10) Patent No.: US 12,574,982 B2
(45) Date of Patent: Mar. 10, 2026

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 17/846,919

(22) Filed: Jun. 22, 2022

(65) Prior Publication Data

US 2022/0330367 A1 Oct. 13, 2022

Related U.S. Application Data

(63) Continuation of application No. PCT/JP2020/046987, filed on Dec. 16, 2020.

(30) Foreign Application Priority Data

Dec. 24, 2019 (JP) ................................. 2019-233222

(51) Int. Cl.
H04W 76/15 (2018.01)
H04W 48/16 (2009.01)
(Continued)

(52) U.S. Cl.
CPC ........... H04W 76/15 (2018.02); H04W 48/16 (2013.01); H04W 72/21 (2023.01); H04W 80/02 (2013.01)

(58) Field of Classification Search
CPC . H04W 48/16; H04W 48/20; H04W 72/0453; H04W 72/21; H04W 76/15;
(Continued)

(56) References Cited

U.S. PATENT DOCUMENTS

| 6,089,761 A | 7/2000 | Sakurai |
| 2012/0195587 A1 | 8/2012 | Hasuda et al. |

(Continued)

FOREIGN PATENT DOCUMENTS

| CN | 106688291 A | 5/2017 |
| CN | 110199549 A | 9/2019 |

(Continued)

OTHER PUBLICATIONS

Jang, Insun; Channel Access for Multi-link Operation; Jul. 15, 2019; LG Electronics. IEEE 802.11-19/1144r3.
(Continued)

*Primary Examiner* — Mansour Oveissi
(74) *Attorney, Agent, or Firm* — Canon U.S.A., Inc. IP Division

(57) ABSTRACT

A communication apparatus communicates a wireless frame compliant with an Institute of Electrical and Electronics Engineers (IEEE) 802.11 series standard with a partner apparatus, wherein a media access control (MAC) frame of the wireless frame includes information indicating a frequency channel as information related to communications via a plurality of links compliant with the IEEE 802.11 series standard to be established on a plurality of different frequency channels where an apparatus transmitted the wireless frame and a partner apparatus can perform wireless communication compliant with the IEEE 802.11 series standard.

15 Claims, 7 Drawing Sheets

(51) Int. Cl.
  *H04W 72/21*     (2023.01)
  *H04W 80/02*     (2009.01)
(58) Field of Classification Search
  CPC ....... H04W 8/24; H04W 80/02; H04W 84/12;
                                    Y02D 30/70
  See application file for complete search history.

(56)              References Cited

U.S. PATENT DOCUMENTS

| | | | |
|---|---|---|---|
| 2017/0163331 A1 | 6/2017 | Breiling | |
| 2017/0180088 A1 | 6/2017 | Adachi | |
| 2018/0206143 A1 | 7/2018 | Patil et al. | |
| 2019/0082373 A1* | 3/2019 | Patil | H04L 1/1614 |
| 2019/0150214 A1 | 5/2019 | Zhou | |
| 2019/0335454 A1 | 10/2019 | Huang et al. | |
| 2019/0372640 A1 | 12/2019 | Sadiq | |
| 2021/0045175 A1* | 2/2021 | Huang | H04L 5/0055 |
| 2022/0272783 A1* | 8/2022 | Yang | H04W 76/11 |

FOREIGN PATENT DOCUMENTS

| | | | |
|---|---|---|---|
| CN | 110519862 A | 11/2019 | |
| CN | 110546958 A | 12/2019 | |
| JP | WO2016088726 A1 | 6/2017 | |
| JP | 2018050133 A | 3/2018 | |
| JP | 2019080320 A | 5/2019 | |
| WO | 2016088726 A1 | 6/2016 | |

OTHER PUBLICATIONS

Insun Jang, Channel Access for Multi-link Operation, IEEE 802. 22-19/1144r3. Sep. 2019, (URL: https://mentor.ieee.org/802.11/dcn/ 19/11-19-1144-03-00be-channel-access-for-multi-link-operation. pptx), p. 2-4.

* cited by examiner

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2020/046987, filed Dec. 16, 2020, which claims the benefit of Japanese Patent Application No. 2019-233222, filed Dec. 24, 2019, both of which are hereby incorporated by reference herein in their entirety.

BACKGROUND OF THE INVENTION

Field of the Invention

The present invention relates to transmission and reception of communication-related information in wireless communication.

Background Art

The Institute of Electrical and Electronics Engineers (IEEE) 802.11 series is known as wireless local area network (WLAN) communication standards formulated by the IEEE. The IEEE 802.11 series standards include standards such as the IEEE 802.11a/b/g/n/ac/ax standards.

Patent Literature 1 (PTL1) discusses performance of wireless communication in which, in a case of communication compliant with the IEEE 802.11ax standard, orthogonal frequency division multiplex access (OFDMA) is used. In the wireless communication compliant with The IEEE 802.11ax standard, using OFDMA allows to achieve high peak throughput.

PTL 1: Japanese Patent Laid-Open No. 2018-50133

The IEEE is considering the formulation of the IEEE 802.11be standard as a new IEEE 802.11 series standard for even higher throughput and improved frequency use efficiency. As for the IEEE 802.11be standard, a technique for establishing a plurality of links between an access point (AP) and a station (STA) via a plurality of different frequency channels to perform communication is being considered.

As described above, in the IEEE 802.11be standard, multi-link communication in which an AP and an STA establish a plurality of links on different frequency channels and communicate in parallel is being considered. To perform multi-link communication, multi-link communication-related information, such as multi-link communication capability information about the AP, needs to be communicated between the AP and the STA. A media access control (MAC) frame which is a frame for appropriately communicating the multi-link communication-related information is a newly developed format.

SUMMARY OF THE INVENTION

In view of the foregoing, the present invention is directed to enabling use of an appropriate MAC frame to communicate information about communication via a plurality of links compliant with an IEEE 802.11 series standard to be established with a partner apparatus on a plurality of different frequency channels.

With the above-described objective, a communication apparatus includes a communication unit configured to communicate a wireless frame compliant with an Institute of Electrical and Electronics Engineers (IEEE) 802.11 series standard with another communication apparatus, wherein a media access control (MAC) frame of the wireless frame communicated by the communication unit includes information indicating a frequency channel as information related to communications via a plurality of links compliant with the IEEE 802.11 series standard to be established on a plurality of different frequency channels where an apparatus transmitted the wireless frame and a partner apparatus can perform wireless communication compliant with the IEEE 802.11 series standard.

Further features of the present invention will become apparent from the following description of exemplary embodiments with reference to the attached drawings.

DESCRIPTION OF THE EMBODIMENTS

An exemplary embodiment of the present invention will be described in detail below with reference to the attached drawings. The configuration described in the following exemplary embodiment is just an example, and the present invention is not limited to the illustrated configuration.

Figure 1:
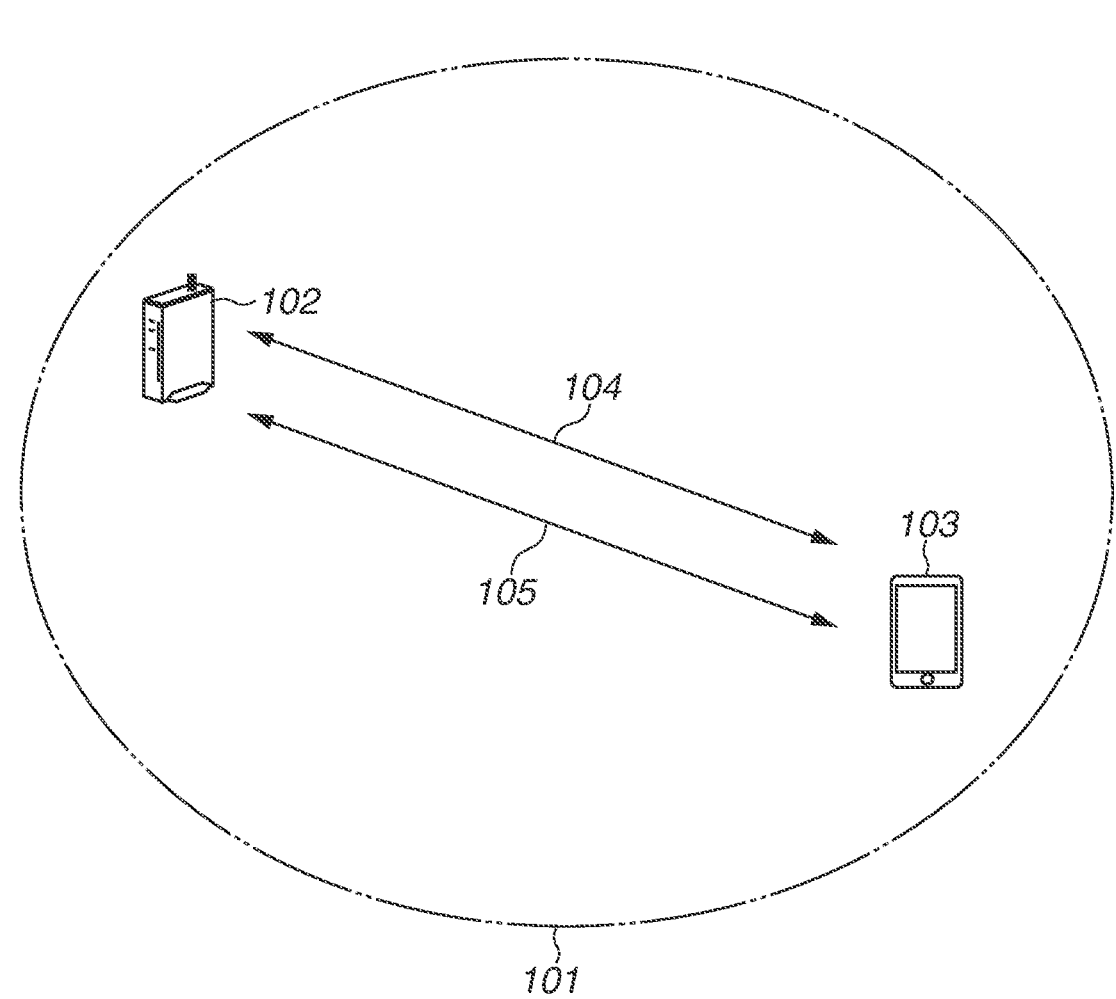
FIG. 1 is a diagram illustrating a configuration of a network to which a communication apparatus belongs.

FIG. 1 illustrates a configuration of a network in which a communication apparatus 102 according to the present exemplary embodiment participates. The communication apparatus 102 is an access point (AP) intended to construct a network 101. The network 101 is a wireless network. In the present exemplary embodiment, in a case where the communication apparatus 102 constructs a plurality of networks, all the networks have the same basic service set identifier (BSSID). A BSSID is an identifier for identifying a network. Service set identifiers (SSIDs) that are presented by the communication apparatus 102 in any of the networks are also the same. An SSID is an identifier for identifying an AP. In the present exemplary embodiment, the communication apparatus 102 uses one SSID even if a plurality of connections is established.

A communication apparatus 103 is a station (STA) intended to join the network 101. Each communication apparatus supports the Institute of Electrical and Electronics Engineers (IEEE) 802.11be (Extremely High Throughput or Extreme High Throughput [EHT]) standard, and can perform wireless communication compliant with the IEEE 802.11be standard via the network 101. Each communication apparatus can communicate in 2.4-GHz, 5-GHz, and 6-GHz frequency bands. The frequency bands for the communication apparatuses are not limited thereto. Other frequency bands such as a 60-GHz band may be used. Each communication apparatus can communicate in bandwidths of 20, 40, 80, 160, and 320 MHz.

The communication apparatuses 102 and 103 can implement multi-user (MU) communication where signals from a plurality of users are multiplexed by performing orthogonal frequency division multiple access (OFDMA) communication compliant with the IEEE 802.11be standard. In OFDMA communication, grouped portions (Resource Units [RU]) of a frequency band are assigned to STAs in a non-overlapping manner, and carriers assigned to the respective STAs are orthogonal to each other. The AP can thus communicate with a plurality of STAs in parallel.

The communication apparatuses 102 and 103 perform multi-link communication by establishing links via a plurality of frequency channels. As employed herein, a frequency channel refers to a channel which is defined in an IEEE 802.11 series standard, and also in which wireless communication compliant with the IEEE 802.11 series standard can be performed. The IEEE 802.11 series standard defines a plurality of frequency channels in each of the 2.4-GHz, 5-GHz, and 6-GHz frequency bands. In the IEEE 802.11 series standard, each frequency channel is defined to have a bandwidth of 20 MHz. Further, a bandwidth of 40 MHz or more can also be used as a single frequency channel by adjoining frequency bands. For example, the communication apparatus 102 can establish a first link 104 via a first frequency channel in the 2.4-GHz band and a second link 105 via a second frequency channel in the 5-GHz band with the communication apparatus 103, and communicate via both the links. In such a case, the communication apparatus 102 maintains the second link 105 via the second frequency channel in parallel with the first link 104 via the first frequency channel. The communication apparatus 102 can improve the throughput of the communication with the communication apparatus 103 by thus establishing links via a plurality of frequency channels with the communication apparatus 103. The communication apparatuses 102 and 103 may establish a plurality of links at different frequency bands in multi-link communication. For example, the communication apparatuses 102 and 103 may establish a third link in the 6-GHz band in addition to the first link 104 in the 2.4-GHz band and the second link 105 in the 5-GHz band. Alternatively, the communication apparatuses 102 and 103 may establish links via a plurality of different channels included in the same frequency band. For example, the communication apparatuses 102 and 103 may establish the first link 104 via 1 ch of the 2.4-GHz band and the second link 105 via 5 ch of the 2.4-GHz band. Links in the same frequency band and links in different frequency bands can be established at the same time. For example, the communication apparatuses 102 and 103 may establish a third link via 36 ch of the 5-GHz band in addition to the first link 104 via 1 ch of the 2.4-GHz band and the second link 105 via 5 ch of the 2.4-GHz. By establishing a plurality of connections in different frequency bands with the communication apparatus 103, the communication apparatus 102 can communicate with the communication apparatus 103 in one band even in a case where another band is congested. This can prevent a drop in the throughput of the communication with the communication apparatus 103.

In multi-link communication, a plurality of links established between the communication apparatuses 102 and 103 is at least links each on a different frequency channel. In multi-link communication, the channel distance between the frequency channels of the plurality of links established between the communication apparatuses 102 and 103 is at least greater than 20 MHz. While, in the present exemplary embodiment, the communication apparatuses 102 and 103 establish the first link 104 and the second link 105, the communication apparatuses 102 and 103 may establish three or more links.

In the multi-link communication, the communication apparatuses 102 and 103 can communicate in three modes. One is an asynchronous mode (async mode). In this mode, communications via the plurality of links in the multi-link communication are performed asynchronously from each other. Specifically, the communication via the first link and the communication via the second link are performed at respective independent timings. The first link and the second link each can thus perform communication at a timing irrespective of the communication timing of the other. In such a case, if the channel distance between the frequency channels (channels) of the respective links is narrow, the communication on one link can affect the communication on the other. Specifically, if the frequency channels of the links are close, the communication performed on one link can be detected by the other in carrier sensing, which disables the communication on the other link while the one link is communicating. Thus, in the async mode, the channel distance between links is set wide. Another mode is a synchronous mode (sync mode). In this mode, the communications via the plurality of links is asynchronously performed. Specifically, the first link and the second link start respective communications at the same timing. Since the communications via the respective links are started at the same time, the communication on one link will not be detected by the other link in carrier sensing. The channel distance between channels of the respective links can thus be set narrow. The other mode is a semi-asynchronous mode (semi-async mode). In this mode, in a case where data is to be communicated via one link and the frequency channel of the other link is idle, communication via both the links is synchronously performed. For example, in a case where a back-off counter of the first link becomes 0 and the frequency channel of the second link is idle, communication via the first link and the second link is started at the same timing. Here, the back-off counter of the second link does not need to be 0. In a case where the back-off counter of the first link becomes 0 and the frequency channel of the second link is not idle, only the communication via the first link is started without starting the communication via the second link. In this mode, in a case where communications via a plurality of links are performed in parallel, the communications via the respective links is started at the same time. Thus, the distance between the channels of the respective links may be set narrow. The communication apparatuses 102 and 103 may select the mode to be used in the multi-link communication, based on the channel distance between the plurality of links established.

In performing multi-link communication, at least either one of the communication apparatuses 102 and 103 is an apparatus that can transmit data via a link and receive data via another link at the same time. Alternatively, at least either one of the communication apparatuses 102 and 103 may be an apparatus that, when transmitting data via one link, can only transmit data via another link at the same time. Alternatively, at least either one of the communication apparatuses 102 and 103 may be an apparatus that, when receiving data via one link, can only receive data via another link at the same time. Alternatively, at least either one of the communication apparatuses 102 and 103 may be an apparatus that can maintain a plurality of links at the same time but, when communicating data via one link, is unable to communicate data via another link at the same time. Such a communication apparatus is regarded as not supporting the sync mode or the semi-async mode.

In performing multi-link communication, the communication apparatuses 102 and 103 each divide a piece of data and transmit the divided pieces of data to the partner apparatus via the plurality of links. Alternatively, the communication apparatuses 102 and 103 may transmit the same data via the plurality of links so that the communication via one link serves as a backup to the communication via the other. Specifically, the communication apparatus 102 transmits the same data to the communication apparatus 103 via the first link using the first frequency channel and the second link using the second frequency channel. In such a case, if an error occurs in the communication via the first link, for example, the communication apparatus 103 can receive the data transmitted from the communication apparatus 102 since the same data is also transmitted via the second link. Alternatively, the communication apparatuses 102 and 103 may selectively use the links in accordance with the type of frame or data to be communicated. For example, the communication apparatus 102 may transmit a management frame via the first link and transmit data frame including data via the second link. Specific examples of the management frame include a Beacon frame, Probe Request/Response frames, and Association Request/Response frames. In addition to such frames, a Disassociation frame, an Authentication frame, a Deauthentication frame, and an Action frame are also referred to as management frames. The Beacon frame is a frame for notifying network information. The Probe Request frame is a frame for requesting network information. The Probe Response frame is a response to the Request frame and is a frame for providing network information. The Association Request frame is a frame for requesting connection. The Association Response frame is a response to the Association Request frame and is a frame indicating a connection permission, an error, etc. The Disassociation frame is a frame for disconnecting the connection. The Authentication frame is a frame for authenticating the partner apparatus. The Deauthentication frame is a frame for aborting the authentication of the partner apparatus and disconnecting the connection. The Action frame is a frame for performing an additional function other than the foregoing functions. The communication apparatuses 102 and 103 transmit and receive management frames compliant with the IEEE 802.11 series standard. Alternatively, in transmitting data related to a captured image, for example, the communication apparatus 102 may transmit meta information, such as the date, imaging parameters (aperture value and shutter speed), and position information via the first link, and transmit pixel information via the second link.

The communication apparatuses 102 and 103 may be capable of multiple-input and multiple-output (MIMO) communication. In such a case, the communication apparatuses 102 and 103 include a plurality of antennas. Either one of the communication apparatuses 102 and 103 transmits different signals from the respective antennas using the same frequency channel. The receiver apparatus receives all the signals arriving from the plurality of streams using the plurality of antennas at the same time, and divides and decodes the signals of the respective streams. By performing such MIMO communication, the communication apparatuses 102 and 103 can communicate a greater amount of data, in the same amount of time, than the amount of data of when the MIMO communication is not performed. The communication apparatuses 102 and 103 may perform MIMO communication using some of the links in performing multi-link communication.

While, in the above description, the communication apparatuses 102 and 103 support the IEEE 802.11be standard, the supporting standard can be at least any one of legacy standards preceding the IEEE 802.11be standard. The legacy standards refer to the IEEE 802.11a/b/g/n/ac/ax standards. In the present exemplary embodiment, at least one of the IEEE 802.11a/b/g/n/ac/ax/be standards will be referred to as an IEEE 802.11 series standard. In addition to the IEEE 802.11 series standard, the communication apparatuses 102 and 103 may support other communication standards, such as Bluetooth®, near field communication (NFC), ultra wide band (UWB), Zigbee, and Multiband orthogonal frequency division multiplexing (OFDM) Alliance (MBOA). UWB includes wireless Universal Serial Bus (USB), wireless 1394, and Winet. Wired communication standards, such as a wired local area network (LAN), may also be supported.

Specific examples of the communication apparatus 102 include, but not limited to, a wireless LAN router and a personal computer (PC). The communication apparatus 102 may be any communication apparatus that can perform multi-link communication with another communication apparatus. The communication apparatus 102 may be an information processing apparatus, such as a wireless chip, that can perform wireless communication compliant with the IEEE 802.11be standard. Specific examples of the communication apparatus 103 include, but not limited to, a camera, a tablet, a smartphone, a PC, a mobile phone, and a video camera. The communication apparatus 103 may be any communication apparatus that can perform multi-link communication with another communication apparatus. The communication apparatus 103 may be an information processing apparatus, such as a wireless chip, that can perform wireless communication compliant with the IEEE 802.11be standard. While the network illustrated in FIG. 1 is a network including one AP and one STA, the numbers of APs and STAs are not limited thereto. The information processing apparatus, such as a wireless chip, includes an antenna for transmitting generated signals.

Figure 2:
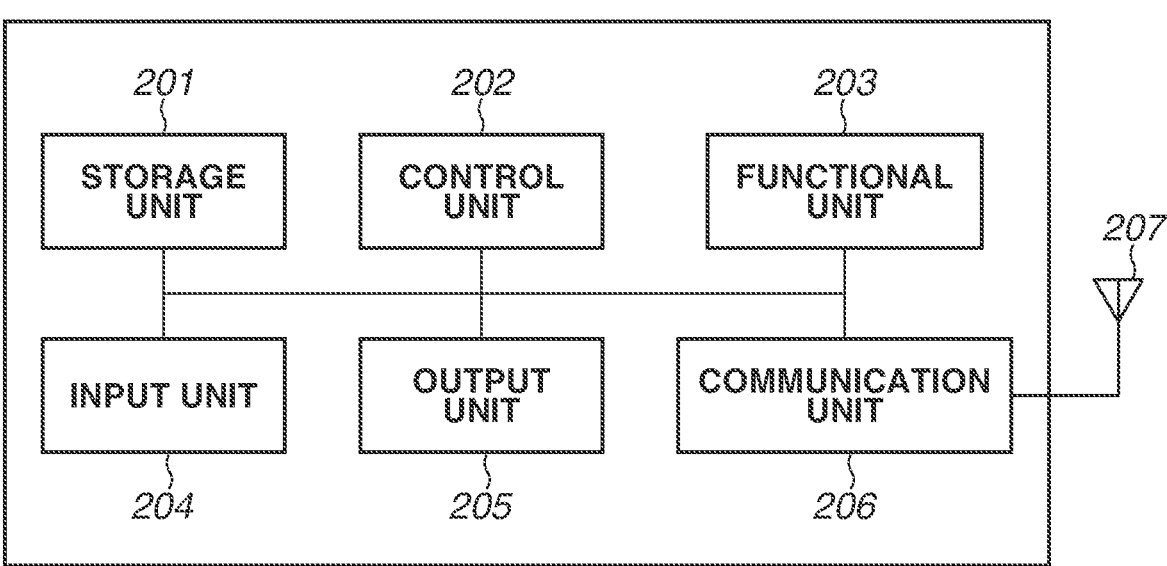
FIG. 2 is a diagram illustrating a hardware configuration of the communication apparatus.

FIG. 2 illustrates a hardware configuration of the communication apparatus 102 according to the present exemplary embodiment. The communication apparatus 102 includes a storage unit 201, a control unit 202, a functional unit 203, an input unit 204, an output unit 205, a communication unit 206, and an antenna 207.

The storage unit 201 includes one or more memories, such as a read-only memory (ROM) and a random access memory (RAM), and stores a computer program for performing various operations to be described below and various types of information, such as communication parameters for wireless communication. Aside from memories such as a ROM and a RAM, storage media, such as a flexible disk, a hard disk, an optical disc, a magneto-optic disc, a compact disc read-only memory (CD-ROM), a compact disc recordable (CD-R), a magnetic tape, a nonvolatile memory card, and a digital versatile disc (DVD) may be used as the storage unit 201. The storage unit 201 may include a plurality of memories.

The control unit 202 includes one or more processors, such as a central processing unit (CPU) and a micro processing unit (MPU), and controls entire operation of the communication apparatus 102 by executing the computer program stored in the storage unit 201. The control unit 202 may be configured to control the entire operation of the communication apparatus 102 through cooperation of the computer program stored in the storage unit 201 and an operating system (OS). Moreover, the control unit 202 generates data and signals (wireless frames) to be transmitted during communication with other communication apparatuses. The control unit 202 may include a plurality of processors like a multi-core processor, and control entire operation of the communication apparatus 102 using the plurality of processors.

The control unit 202 controls the functional unit 203 to perform wireless communication and predetermined processing, such as imaging, printing, and projection. The functional unit 203 is a piece of hardware for the communication apparatus 102 to perform the predetermined processing.

The input unit 204 accepts various operations from the user. The output unit 205 performs various outputs to the user via a monitor screen and a speaker. The outputs made by the output unit 205 may include display on the monitor screen, an audio output from the speaker, and a vibration output. Both the input unit 204 and the output unit 205 may be implemented by one module, such as a touch panel. The input unit 204 and the output unit 205 each may be integrated with the communication apparatus 102 or separate from the communication apparatus 102.

The communication unit 206 controls wireless communication compliant with the IEEE 802.11be standard. The communication unit 206 may also control wireless communication compliant with other IEEE 802.11 series standards in addition to the IEEE 802.11be standard, or control wired communication, such as wired LAN communication. The communication unit 206 controls the antenna 207 to transmit and receive signals, for wireless communication, generated by the control unit 202. In a case where the communication apparatus 102 supports the NFC standard or the Bluetooth® standard in addition to the IEEE 802.11be standard, the communication unit 206 may control wireless communication compliant with such communication standards. In a case where the communication apparatus 102 can perform wireless communication compliant with a plurality of communication standards, the communication apparatus 102 may include communication units and antennas supporting the respective communication standards separately. The communication apparatus 102 communicates data, such as image data, document data, and video data, with the communication apparatus 103 via the communication unit 206. The antenna 207 may be configured as a separate member from the communication unit 206. The antenna 207 may be combined with the communication unit 206 as a single module.

The antenna 207 is an antenna capable of communication in the 2.4-GHz, 5-GHz, and 6-GHz bands. In the present exemplary embodiment, the communication apparatus 102 has one antenna. However, the communication apparatus 102 may include antennas each corresponding to different one of the frequency bands. In a case where the communication apparatus 102 includes a plurality of antennas, the communication apparatus 102 may also include communication units 206 each corresponding to different one of the plurality of antennas.

The communication apparatus 103 has a similar hardware configuration to that of the communication apparatus 102.

Figure 3:
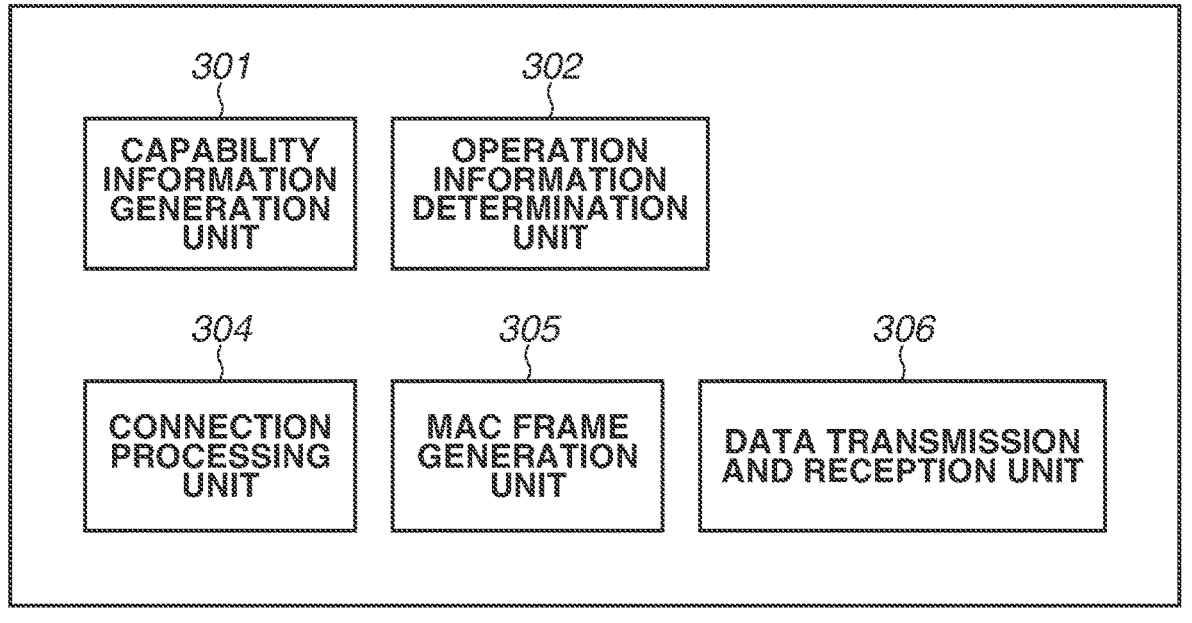
FIG. 3 is a diagram illustrating a functional configuration of the communication apparatus.

FIG. 3 illustrates a functional configuration of the communication apparatus 102 according to the present exemplary embodiment. The communication apparatus 102 includes a capability information generation unit 301 for multi-link communication, an operation information determination unit 302 for multi-link communication, and a connection processing unit 304. The communication apparatus 102 further includes a media access control (MAC) frame generation unit 305 and a data transmission and reception unit 306.

The capability information generation unit 301 is a block for generating multi-link communication-related capability information about the communication apparatus 102. The communication apparatus 102 generates the capability information for notifying another communication apparatus of the multi-link communication-related capabilities of the own apparatus. The multi-link communication-related capability information will be described below with reference to FIG. 5. As for the capability information, the communication apparatus 102 may notify another communication apparatus of the capability information about the own apparatus, or only receive capability information about another communication apparatus as the partner apparatus.

The operation information determination unit 302 is a block for determining operation information about multi-link communication with the partner apparatus, based on the multi-link communication-related capability information about the own apparatus and the partner apparatus. The operation information about the multi-link communication refers to frequency channels and bandwidths to be used in the multi-link communication between the communication apparatuses 102 and 103. Details of the multi-link communication-related operation information will be described below with reference to FIG. 5. The communication apparatus 102 may or may not notify the partner apparatus of the determined operation information.

The connection processing unit 304 is a block for performing processing for enabling the communication apparatus 103, serving as a STA, to join the network 101 constructed by the communication apparatus 102. Specifically, the connection processing unit 304 causes the communication apparatus 102 to transmit an Association Response frame as a response to an Association Request that is a connection request received from the communication apparatus 103. The communication apparatus 102 includes connection processing units 304 each corresponding to different one of a plurality of links which are established by the own apparatus.

The MAC frame generation unit 305 is a block for generating a MAC frame including the multi-link communication-related capability information generated by the capability information generation unit 301 and the multi-link communication-related operation information determined by the operation information determination unit 302. The MAC frame generated by the MAC frame generation unit 305 is included in at least any one of Beacon, Probe Response, and Association Response wireless frames, and transmitted. In addition to or instead of this, the generated MAC frame is included in a Reassociation Response, and transmitted. The capability information and the operation information included in the MAC frame generated by the MAC frame generation unit 305 are expressed by an element illustrated in FIG. 5 to be described below.

The data transmission and reception unit 306 is a block for transmitting and receiving data frames in multi-link communication, based on the multi-link communication-related operation information determined by the operation information determination unit 302. The data transmission and reception unit 306 may transmit a wireless frame including the MAC frame generated by the MAC frame generation unit 305, and receive a wireless frame from the partner apparatus.

The communication apparatus 103 has a similar functional configuration to that of the communication apparatus 102 except for the following points.

The communication apparatus 103 includes, instead of the operation information determination unit 302, a request information determination unit (not illustrated). The request information determination unit is a block for determining request information about the multi-link communication with the partner apparatus, based on the multi-link communication-related capability information about the own apparatus and the partner apparatus. The request information about the multi-link communication refers to frequency channels and bandwidths that are requested to be used in the multi-link communication between the communication apparatuses 102 and 103. Details of the multi-link communication-related request information will be described below with reference to FIG. 5. The communication apparatus 103 may or may not notify the partner apparatus of the determined request information.

The connection processing unit 304 is a block for performing processing for enabling the communication apparatus 103 to join the network 101 constructed by the communication apparatus 102 serving as the AP. Specifically, the connection processing unit 304 causes the communication apparatus 103 to transmit an Association Request that is a connection request to the communication apparatus 102, and receives an Association Response from the communication apparatus 102 as a response.

The MAC frame generation unit 305 is a block for generating a MAC frame including the multi-link communication-related capability information generated by the capability information generation unit 301 and the multi-link communication-related request information determined by the request information determination unit. The MAC frame generated by the MAC frame generation unit 305 is included in at least any one of Probe Request, Association Request, and Reassociation Request wireless frames, and transmitted. The capability information and the request information included in the MAC frame generated by the MAC frame generation unit 305 are expressed by the element illustrated in FIG. 5 to be described below.

Figure 4:
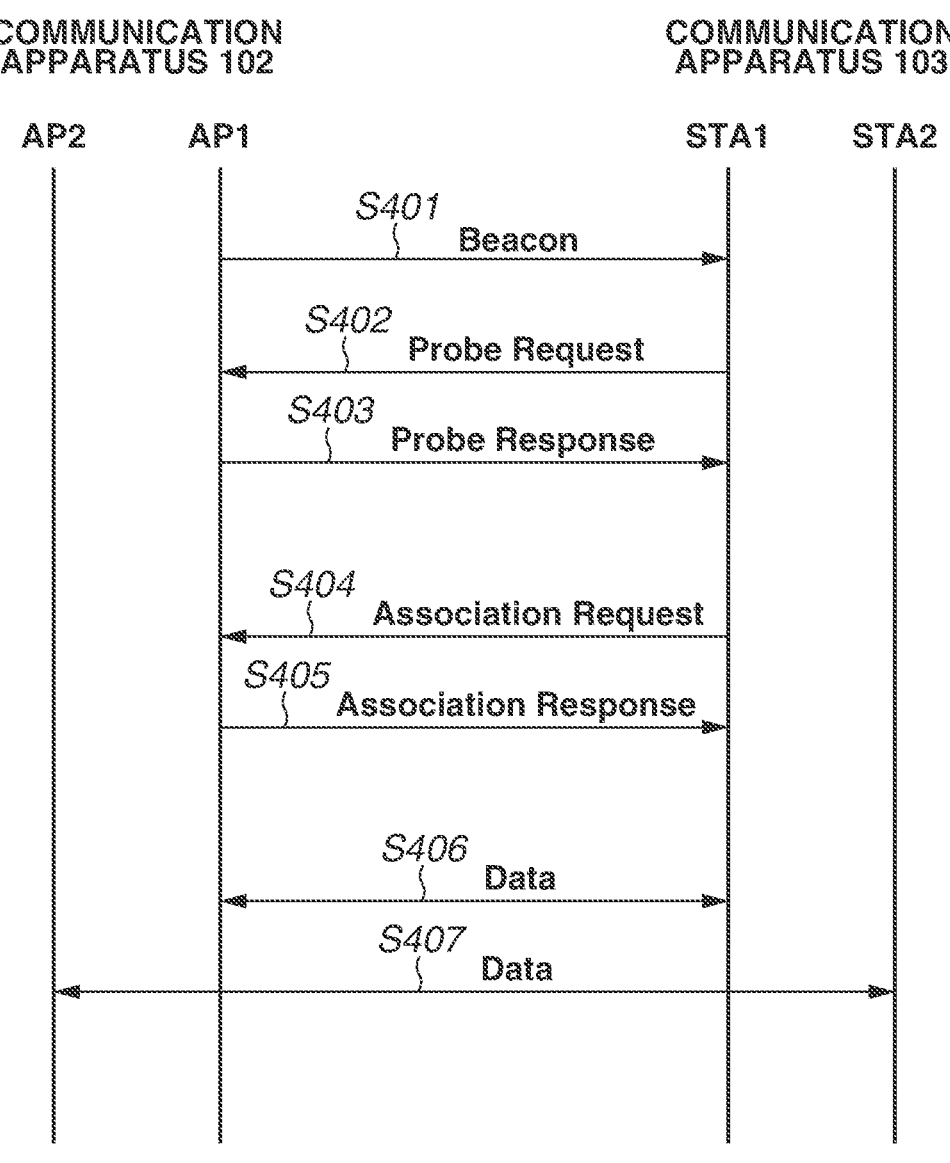
FIG. 4 is a sequence diagram illustrating an example of processing executed when the communication apparatus and another communication apparatus perform multi-link communication.

FIG. 4 is a sequence diagram illustrating an example of processing executed in a case where the communication apparatuses 102 and 103 perform multi-link communication.

The communication apparatuses 102 and 103 each include connection processing units 304 corresponding to a plurality of respective links. The connection processing unit 304 of the communication apparatus 102 corresponding to the first link is referred to as an AP1. The connection processing unit 304 of the communication apparatus 102 corresponding to the second link is referred to as an AP2. The connection processing unit 304 of the communication apparatus 103 corresponding to the first link is referred to as an STA1. The connection processing unit 304 of the communication apparatus 103 corresponding to the second link 105 is referred to as an STA2. The STA1 and the AP1 perform communication processing via the first frequency channel (for example, 1 ch of the 2.4-GHz band). The STA2 and the AP2 perform communication processing via the second frequency channel (for example, 36 ch of the 5-GHz band).

The processing of this sequence is started in response to power-on of each of the communication apparatuses 102 and 103. Alternatively, at least either one of the communication apparatuses 102 and 103 may start the processing in response to receipt of an instruction to start multi-link communication from the user or an application. Alternatively, at least either one of the communication apparatuses 102 and 103 may start the processing in response to the amount of data to be communicated with the partner apparatus being reached or exceeded a predetermined threshold.

In step S401, the communication apparatus 102 initially notifies nearby STAs of network information about the own apparatus by transmitting a Beacon including the network information on the first frequency channel. Specific examples of the network information include a transmission interval at which the communication apparatus 102 transmits a Beacon, and the SSID of the communication apparatus 102. In addition, the communication apparatus 102 may notify the nearby STAs of the multi-link communication-related capability information about the communication apparatus 102 by including the multi-link capability element illustrated in FIG. 5 to be described below into the Beacon as the network information.

In step S402, in response to receipt of the Beacon transmitted from the communication apparatus 102 on the first frequency channel, the communication apparatus 103 transmits a Probe Request on the first frequency channel to inquire of the network information about the communication apparatus 102. The Probe Request includes the SSID of the communication apparatus 103. In addition, the communication apparatus 103 may notify the communication apparatus 102 of the multi-link communication-related capability information about the communication apparatus 103 by including the multi-link capability element illustrated in FIG. 5 to be described below into the Probe Request.

Figure 5:
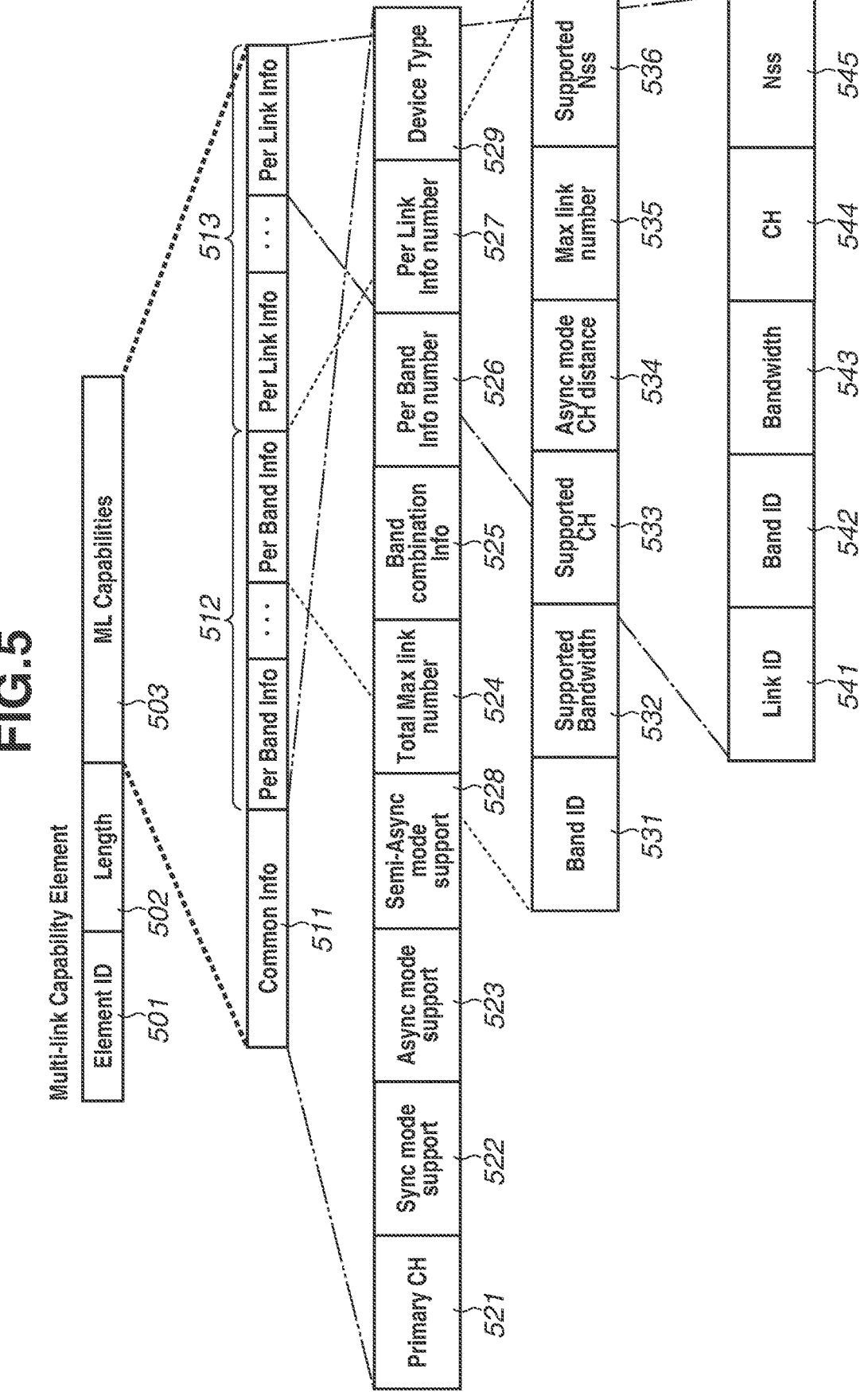
FIG. 5 is a diagram illustrating an example of a frame format of a multi-link capability element.

In step S403, in response to receipt of the Probe Request, the communication apparatus 102 transmits a Probe Response to the communication apparatus 103 on the first frequency channel as a response. In a case where the multi-link capability element illustrated in FIG. 5 is not included in the Beacon, the communication apparatus 102 includes the element in the Probe Response and transmits the Probe Response. Alternatively, the communication apparatus 102 may include only a part of the information included in the multi-link capability element illustrated in FIG. 5 to be described below into the Beacon, and include the remaining information or all the information into the Probe Response.

By performing the processing of steps S401 to S403, the communication apparatuses 102 and 103 can exchange their multi-link communication-related capability information with each other.

Next, the communication apparatus 103 transmits an Association Request that is a connection request to the communication apparatus 102 on the first frequency channel Here, the communication apparatus 103 may notify the communication apparatus 102 of the multi-link communication-related capability information about the communication apparatus 103 by including the multi-link capability element illustrated in FIG. 5 into the Association Request. The communication apparatus 103 may determine the capability information to be transmitted in step S404, based on the multi-link communication-related capability information about the communication apparatus 102 obtained at least in either one of steps S401 and S403. For example, in a case where the communication apparatus 103 can support a combination of links in the 2.4-GHz band and the 5-GHz in multi-link communication while the communication apparatus 102 only supports a plurality of links in the 2.4-GHz band, the communication apparatus 103 may transmit only capability information related to the establishment of a plurality of links in the 2.4-GHz band as the capability information to be transmitted in this step. In the above-described present exemplary embodiment, the communication apparatus 103 transmits the multi-link communication-related capability information about the own apparatus in step S402. However, this is not restrictive. The communication apparatus 103 may transmit the capability information not in step S402 but only in this step. Alternatively, the communication apparatus 103 may transmit not capability information but request information to be requested in performing multi-link communication by including the multi-link capability element illustrated in FIG. 5 into the Association Request. The request information to be requested by the communication apparatus 103 may be expressed by the multi-link capability element illustrated in FIG. 5, or by another element. Details of the request information will be described below with reference to FIG. 5.

In step S405, in response to receipt of the Association Request, the communication apparatus 102 transmits an Association Response to the communication apparatus 103 on the first frequency channel as a response. The Association Response transmitted here includes the multi-link capability element expressing the operation information for use in performing multi-link communication with the communication apparatus 103, determined by the communication apparatus 102. The operation information may be expressed by an element other than the multi-link capability element. In a case where the Association Request transmitted in step S404 includes the operation information requested by the communication apparatus 103 serving as the STA, the communication apparatus 102 may transmit an Association Response including only information about whether the request is accepted.

In step S406, in a case where the communication apparatus 103 is capable of the multi-link communication specified by the operation information included in the Association Response, the communication apparatuses 102 and 103 establish a link via the first frequency channel, and start data communication. Here, in a case where the operation information transmitted from the communication apparatus 102 includes operation information about a link via the second frequency channel, then in step S407, the communication apparatuses 102 and 103 also establish another link via the second frequency channel and start data communication.

In a case where, in step S405, the communication apparatus 102 accepts the request information requested by the communication apparatus 103 in step S404, the processing of step S406 is similarly performed. In a case where the request information transmitted by the communication apparatus 103 in step S404 also includes request information about the link via the second frequency channel, the processing of step S407 is performed.

In the present exemplary embodiment, two links are established by the transmission and reception of frames on one frequency channel. However, this is not restrictive, and three or more links may be established.

In the above-described present exemplary embodiment, the multi-link communication is started from a state where no link is established between the communication apparatuses 102 and 103 yet. However, this is not restrictive. The communication apparatuses 102 and 103 may start multi-link communication by establishing a new link in addition to already established one. In such a case, the communication apparatus 103 serving as the STA may start processing at step S404 in a case where the multi-link communication-related capability information about the communication apparatus 102 serving as the AP has already been obtained. Alternatively, the communication apparatus 102 may enable the communication apparatus 103 to start processing at step S404 by transmitting a signal for causing the communication apparatus 103 to transmit an Association Request in a case where the multi-link communication-related capability information about the communication apparatus 103 has already been obtained. Alternatively, the communication apparatuses 102 and 103 may establish a new link in addition to a plurality of already established links. Here, the sequence of FIG. 4 can also be started at step S404.

In the above-described present exemplary embodiment, links via a plurality of frequency channels are established by the transmission and reception of frames on one frequency channel. However, this is not restrictive. The communication apparatuses 102 and 103, in a case of performing multi-link communication, may disconnect already established links via a plurality of frequency channels by transmitting and receiving frames via one frequency channel. For example, in a case where the communication apparatuses 102 and 103 have established the first link via the first frequency channel and the second link via the second frequency channel, and are performing multi-link communication, and when either one of the communication apparatuses 102 and 103 transmits a Disassociation that is a link disconnection request to the partner apparatus via the first link, the communication apparatuses 102 and 103 disconnect not only the first link but the second link as well if the transmitted Disassociation includes information about the second link. In such a manner, by transmitting and receiving a Disassociation, the communication apparatuses 102 and 103 may disconnect not only the link via which the Disassociation is transmitted and received but also the other link indicated by information included in the Disassociation. Moreover, the communication apparatuses 102 and 103 may disconnect three or more links at the same time. In a case where the Disassociation includes information about a link other than the one via which the Disassociation is transmitted and received, the communication apparatuses 102 and 103 may disconnect only the other link. In such a case, the communication apparatuses 102 and 103 do not disconnect the link via which the Disassociation is transmitted and received.

As illustrated in FIG. 4, the communication apparatuses 102 and 103 can control establishment and disconnection of a link on another frequency channel by transmitting and receiving frames via one frequency channel (or link). The communication apparatuses 102 and 103 can also control establishment and disconnection of links on a plurality of frequency channels by transmitting and receiving frames via one frequency channel (or link).

FIG. 5 is a diagram illustrating an example of the frame format of the multi-link capability element. In the present exemplary embodiment, the element illustrated in FIG. 5 is named multi-link capability element. However, this is not restrictive, and other names, such as multi-link element, may be used.

The communication apparatuses 102 and 103 each can notify the partner apparatus of the capability information indicating the capabilities of the own apparatus in multi-link communication by using the multi-link capability element illustrated in FIG. 5. Moreover, the communication apparatus 102 can notify the partner apparatus of the operation information in performing multi-link communication in addition to or instead of the capability information, by using the multi-link capability element illustrated in FIG. 5. The communication apparatus 103 can notify the partner apparatus of request information in performing multi-link communication in addition to or instead of the capability information, by using the multi-link capability element illustrated in FIG. 5.

The multi-link capability element illustrated in FIG. 5 includes an Element identifier (ID) 501, a Length 502, and a Multi-Link (ML) Capabilities 503. The Element ID 501 is a field containing an ID for identifying the element. In the present exemplary embodiment, the Element ID 501 contains an ID representing the multi-link capability element. The Length 502 is a field indicating the data length of the element. In the present exemplary embodiment, the Length 502 contains information indicating the data length of the ML Capabilities 503. The ML Capabilities 503 contains information specific to the multi-link capability element, i.e., multi-link communication-related information. Details of the information contained in the ML Capabilities 503 will be described below.

The communication apparatuses 102 and 103 each generate the multi-link capability element illustrated in FIG. 5 in order from the Element ID 501, and transmit the generated multi-link capability element to the partner apparatus. In such a case, the communication apparatuses 102 and 103 generates all the fields in the frame before transmission. Specifically, the communication apparatuses 102 and 103 each generate all of the Element ID 501, the Length 502, and the ML Capabilities 503 before transmission to the other apparatus. Alternatively, the communication apparatuses 102 and 103 may generate and transmit the fields in parallel. Specifically, the communication apparatuses 102 and 103 may transmit the generated Element ID 501 concurrently with the generation of the Length 502.

The communication apparatus 102 serving as the AP adds a MAC frame including the multi-link capability element to a wireless frame, such as a Beacon and a Probe Response, and transmits the resulting wireless frame. Aside from these wireless frames, the communication apparatus 102 can also add the MAC frame including the element to a wireless frame, such as an Association Response and a Reassociation Response. The communication apparatus 103 serving as the STA adds a MAC frame including the multi-link capability element to a wireless frame, such as a Probe Request and an Association Request, and transmits the resulting wireless frame. Aside from these wireless frames, the communication apparatus 103 can also add the MAC frame including the element to a Reassociation Request.

The ML Capabilities 503 includes a Common Info 511, Per Band Infos 512, and Per Link Infos 513. The Common Info 511 is a field indicating information common to all frequency bands and links. The Per Band Infos 512 are fields indicating information common to all links included in respective specific frequency bands. The information is indicated frequency band by frequency band. The Per Link Infos 513 are fields indicating information about the respective links.

The Common Info 511 includes a Primary Channel (Ch) 521, a Sync Mode Support 522, an Async Mode Support 523, and a Semi-Async Mode Support 528. The Common Info 511 further includes a Total Max Link Number 524, a Band Combination Info 525, and a Per Band Info Number 526. The Common Info 511 further includes a Per Link Info Number 527, and a Device Type 529.

The Primary CH 521 is a field containing information indicating the frequency channel on which management frames related to multi-link communication are transmitted and received. A primary CH refers to the frequency channel for use in transmitting and receiving management frames when links in multi-link communication are connected and disconnected. Specifically, the Primary CH 521 contains information indicating the frequency channel to transmit and receive a Beacon including the multi-link capability element. The communication apparatus 102 serving as the AP adds, to the Primary CH 521, information indicating the frequency channel for use in transmitting a Beacon frame including the multi-link capability element. The communication apparatus 103 serving as the STA adds, to the Primary CH 521, information indicating the frequency channel on which the Beacon including the multi-link capability element is received (in other words, on which a Probe Request including the element is to be transmitted). In the present exemplary embodiment, the information indicating the first frequency channel on which the Beacon and the Probe Request/Response are transmitted and received in FIG. 4 is included into the Primary CH 521. In a case where the frequency channel on which management frames are transmitted and received is changed after the start of multi-link communication by the communication apparatuses 102 and 103, the Primary CH 521 contains information about the changed frequency channel. The Primary CH 521 contains the information indicating the frequency channel on which management frames are transmitted and received, regardless of information, among capability information, operation information, and request information, expressed by the element expresses.

The Sync Mode Support 522 is a field containing capability information indicating whether the apparatus, which is the communication apparatus 102 or 103, transmitted the element supports the sync mode of multi-link communication. For example, in a case where this field contains 0, it indicates not supporting the sync mode by the apparatus transmitted the element. In a case where this field contains 1, it indicates supporting the sync mode by the apparatus transmitted the element.

In a case where the multi-link capability element expresses operation information, the Sync Mode Support 522 may indicate whether the sync mode of multi-link communication is to be used. For example, in a case where the communication apparatus 102 transmits an Association Response including the element, this field indicates whether the sync mode is to be used in communication via the links established by exchanging the Association Response. For example, in a case where this field contains 0, it indicates performing the multi-link communication not in the sync mode. In a case where this field contains 1, it indicates performing the multi-link communication in the sync mode.

In a case where the multi-link capability element expresses request information, the Sync Mode Support 522 may indicate whether using of the sync mode of multi-link communication is to be requested. For example, in a case where the communication apparatus 103 serving as the STA transmits an Association Request including the element, this field indicates whether the communication apparatus 103 requests using of the sync mode in multi-link communication. For example, in a case where this field contains 0, the communication apparatus 103 requests performing of multi-link communication not in the sync mode. In a case where this field contains 1, the communication apparatus 103 requests performing of multi-link communication in the sync mode.

The Async Mode Support 523 is a field containing capability information indicating whether the apparatus, which is the communication apparatus 102 or 103, transmitted the element supports the async mode of multi-link communication. For example, in a case where this field contains 0, it indicates not supporting the async mode by the apparatus transmitted the element. In a case where this field contains 1, it indicates supporting the async mode by the apparatus transmitted the element.

In a case where the multi-link capability element expresses operation information, the Async Mode Support 523 may indicate whether the async mode of multi-link communication is to be used. For example, in a case where the communication apparatus 102 transmits an Association Response including the element, this field indicates whether the async mode is to be used on the links established by exchanging the Association Response. In such a case, in a case where this field contains 0, the multi-link communication is performed not in the async mode. In a case where this field contains 1, the multi-link communication is performed in the async mode. Note that in a case where the element expresses operation information and the foregoing Sync Mode Support 522 indicates using the sync mode, this field indicates not using the async mode. Similarly, in a case where the Sync Mode Support 522 indicates not using the sync mode, the Async Mode Support 523 indicates using the async mode.

In a case where the multi-link capability element expresses request information, the Async Mode Support 523 may indicate whether using of the async mode of multi-link communication is to be requested. For example, in a case where the communication apparatus 103 serving as the STA transmits an Association Request including the element, this field indicates whether the communication apparatus 103 requests using of the async mode in multi-link communication. For example, in a case where this field contains 0, the communication apparatus 103 requests performing of the multi-link communication not in the async mode. In a case where this field contains 1, the communication apparatus 103 requests performing of the multi-link communication in the async mode.

The Semi-Async Mode Support 528 is a field containing capability information indicating whether the apparatus, which is the communication apparatus 102 or 103, transmitted the element supports the semi-async mode of multi-link communication. For example, in a case where this field contains 0, it indicates not supporting the semi-async mode by the apparatus transmitted the element. In a case where this field contains 1, it indicates supporting the semi-async mode by the apparatus transmitted the element.

In a case where the multi-link capability element expresses operation information, this field may indicate whether the semi-async mode of multi-link communication is to be used. For example, in a case where the communication apparatus 102 transmits an Association Response including the element, this field indicates whether the semi-async mode is used in communication via the links established by exchanging the Association Response. For example, in a case where this field contains 0, it indicates performing of the multi-link communication not in the semi-async mode. In a case where this field contains 1, it indicates performing of the multi-link communication in the semi-async mode.

In a case where the multi-link capability element expresses request information, this field may indicate whether using of the semi-async mode of multi-link communication is to be requested. For example, in a case where the communication apparatus 103 serving as the STA transmits an Association Request including the element, this field indicates whether the communication apparatus 103 requests using of the semi-async mode in multi-link communication. For example, in a case where this field contains 0, the communication apparatus 103 requests performing of the multi-link communication not in the semi-async mode. For example, in a case where this field contains 1, the communication apparatus 103 requests performing of the multi-link communication in the semi-async mode.

In a case where a mode to be used by the communication apparatuses 102 and 103 in multi-link communication is set in advance from among the sync mode, the async mode, or the semi-async mode, the above described fields may be omitted. Specifically, the Sync Mode Support 522, the Async Mode Support 523, and the Semi-Async Mode Support 528 may be omitted.

The Total Max Link Number 524 is a field containing capability information indicating the maximum number of links that are supported in multi-link communication by the apparatus, which is the communication apparatus 102 or 103, transmitted the element. The maximum number of links refers to the maximum number of links that the apparatus transmitted the element can establish with one partner apparatus. For example, in a case where this field contains a value of 3, the apparatus transmitted the element can establish up to three links per partner apparatus. In such a case, the apparatus transmitted the element may maintain three links with one partner apparatus and concurrently maintain a plurality of links with another partner apparatus as well. Alternatively, the maximum number of links may refer to the maximum number of links that the apparatus transmitted the element can establish in multi-link communication, regardless of the partner apparatuses. In such a case, in a case where, for example, this field contains a value of 3 and the apparatus transmitted the element has already established three links with a partner apparatus or apparatuses, the apparatus transmitted the element is unable to establish another link regardless of the partner apparatuses. In this field, the communication apparatus 102 serving as the AP and the communication apparatus 103 serving as the STA each include information indicating the maximum number of links that the own apparatus can simultaneously maintain in multi-link communication.

In a case where the multi-link capability element expresses operation information, this field may contain the number of links to be actually established in multi-link communication. For example, in a case where the communication apparatus 102 serving as the AP transmits an Association Response including the element, this field indicates the number of links to be established by exchanging the Association Response. Alternatively, this field may contain the maximum number of links that can be established in multi-link communication with the communication apparatus 103. In such a case, the Total Max Link Number 524 contains a value less than or equal to the smaller value among the maximum number of links that the own apparatus can established in multi-link communication and the maximum number of links that the partner apparatus can establish.

In a case where the multi-link capability element expresses request information, this field may contain the number of links requested to be established in multi-link communication. For example, in a case where the communication apparatus 103 serving as the STA transmits an Association Request including the element, this field indicates the number of links to be requested from the communication apparatus 103 to the communication apparatus 102 to establish. Alternatively, this field may contain the maximum number of links that can be established in multi-link communication with the communication apparatus 102.

Note that this field may be omitted in a case where the multi-link capability element expresses operation information or request information.

The Band Combination Info 525 is a field containing capability information indicating the frequency band or bands that is supported by the apparatus, which is the communication apparatus 102 or 103, transmitted the element in multi-link communication. Table 1 illustrates an example of information indicated by each bit of this field. In Table 1, which frequency band or what combination of frequency bands is supported is listed bit by bit. In the present exemplary embodiment, in a case where a bit contains 0, it indicates not supporting multi-link communication corresponding to the description of the bit. In a case where a bit contains 1, it indicates supporting multi-link communication corresponding to the description of the bit. For example, in a case where the Band Combination Info 525 transmitted by the communication apparatus 102 contains 1 in the zeroth bit, it indicates supporting multi-link communication on different channels in the 2.4-GHz band by the communication apparatus 102. For example, in a case where the Band Combination Info 525 contains a value of 00011110, it indicates supporting multi-link communication using a plurality of links in different frequency bands by the communication apparatus 102. It also indicates not supporting multi-link communication using a plurality of links in the same frequency bands by the communication apparatus 102. Not supporting multi-link communication by the apparatus transmitted the element may be indicated by setting all the bits of the Band Combination Info 525 to 0. Alternatively, 0 of each bit may indicate current unavailability of multi-link communication by the apparatus transmitted the element. Note that the communication apparatuses 102 and 103 each may support frequency bands different between communication using only one link and multi-link communication. For example, the communication apparatuses 102 and 103 may support all of the 2.4-GHz, 5-GHz, and 6-GHz bands in communication using only one link, and support only the 5-GHz and 6-GHz bands in multi-link communication. The correspondence between the bits of the Band Combination Info 525 and the descriptions thereof is not limited to that illustrated in Table 1. The number of bits of the Band Combination Info 525 may be increased to indicate whether a plurality of links can be established at more combinations of frequency bands or at other frequency bands.

TABLE 1

| Bit | Description |
|-----|-------------|
| 0 | Capable of multi-link communication using CHs in 2.4-GHz band |
| 1 | Capable of multi-link communication using CHs in 5-GHz band |
| 2 | Capable of multi-link communication using CHs in 6-GHz band |
| 3 | Capable of multi-link communication using CHs in 2.4-GHz and 5-GHz bands |
| 4 | Capable of multi-link communication using CHs in 2.4-GHz and 6-GHz bands |
| 5 | Capable of multi-link communication using CHs in 5-GHz and 6-GHz bands |
| 6 | Capable of multi-link communication using CHs in 2.4-GHz, 5-GHz, and 6-GHz bands |
| 7 | Reserved |

In a case where the multi-link capability element expresses operation information, this field may indicate the frequency band(s) to be actually used in multi-link communication. For example, in a case where the communication apparatus 102 serving as the AP transmits an Association Response including the element, this field contains information indicating the frequency band(s) of the links to be established by exchanging the Association Response. For example, in a case where the communication apparatuses 102 and 103 establish a 2.4-GHz link and a 5-GHz link, the Band Combination Info 525 has a value of 00001000.

In a case where the multi-link capability element expresses request information, this field may indicate the frequency band(s) requested to be used in multi-link communication. For example, in a case where the communication apparatus 103 serving as the STA transmits an Association Request including the element, this field indicates the frequency band(s) to be requested from the communication apparatus 103 to the communication apparatus 102 to perform multi-link communication. Even in a case where the element expresses operation information or request information, this field may contain capability information indicating the frequency band(s) supported by the apparatus transmitted the element in multi-link communication.

The Per Band Info Number 526 is a field containing information indicating the number of Per Band Infos included in the Per Band Infos 512 to be described below. The Per Band Infos 512 include a set of Per Band Infos corresponding to respective frequency bands supported by the apparatus, which is the communication apparatus 102 or 103, transmitted the multi-link capability element in multi-link communication. Specifically, the Per Band Info Number 526 contains information indicating the same number as the number of frequency bands indicated by the Band Combination Info 525. However, this does not apply in a case where information about more than one frequency band is indicated by the same Per Band Info among the Per Band Infos 512 to be described below. In a case where the Per Band Infos 512 to be described below are omitted, this field is also omitted.

The Per Link Info Number 527 is a field containing information indicating the number of Per Link Infos included in the Per Link Infos 513 to be described below. The Per Link Infos 513 include a set of Per Link Infos corresponding to respective links supported by the apparatus, which is the communication apparatus 102 or 103, transmitted the multi-link capability element in multi-link communication. In a case where the Per Link Infos 513 to be described below are omitted, this field is also omitted.

The Device Type 529 is a field containing capability information indicating a type of the apparatus, which is the communication apparatus 102 or 103, transmitted the element is in multi-link communication. Specifically, the Device Type 529 contains information indicating a type of the apparatus transmitted the element from among the following four types. A first type of apparatus refers to an apparatus that can simultaneously transmit data via a link and receive data via another link in multi-link communication. A second type of apparatus refers to an apparatus that, when transmitting data via a link, can only transmit data via another link at the same time. A third type of apparatus refers to an apparatus that, when receiving data via a link, can only receive data via another link at the same time. A fourth type of apparatus refers to an apparatus that can simultaneously maintain a plurality of links but, when communicating data via a link, is unable to simultaneously communicate data via another link.

In a case where the multi-link capability element expresses operation information, the Device Type 529 may indicate an apparatus operation type of each of the apparatuses in multi-link communication from among the above-described type. For example, in a case where the communication apparatus 102 transmits an Association Response including the element, this field indicates an apparatus operation type of the communication apparatus 102 in communication via the links established by exchanging the Association Response. For example, in a case where information indicating the second type is transmitted as the operation information, the communication apparatus 102 operates as an apparatus operating in the second type in communication via the links established by exchanging the Association Response, even in a case where the communication apparatus 102 can operate as an apparatus operating in the first type.

In a case where the multi-link capability element expresses request information, the Device Type 529 may indicate a request for an apparatus operation type in multi-link communication. For example, in a case where the communication apparatus 103 serving as the STA transmits an Association Request including the element, this field indicates an apparatus operation type of the communication apparatus 103 in multi-link communication. For example, in a case where this field contains information indicating the second type, the communication apparatus 103 requests operating as an apparatus in the second type in multi-link communication with the communication apparatus 102.

Each Per Band Info 512 is a field including a Band ID 531, a Supported Bandwidth 532, a Supported CH 533, and an Async Mode CH Distance 534. In addition to such fields, the Per Band Info 512 also includes a Max link Number 535 and a Supported number of spatial streams (Nss) 536. The multi-link capability element includes a set of Per band Infos 512 corresponding to the respective frequencies indicated by the Band ID 531 to be described below.

The Band ID 531 is a field containing information for identifying a frequency band. Table 2 illustrates an example of a correspondence between values of the Band ID 531 and descriptions indicated by the values. For example, in a case where the Band ID 531 contains a value of 0, the Per Band Info 512 including this Band ID 531 is information indicating information common to the links of multi-link communication in the 2.4-GHz band. The correspondence between the values of the Band ID 531 and the indicated descriptions is not limited thereto. The number of bits of the Band ID 531 may be increased so that a greater number of frequency bands can be indicated.

TABLE 2

| Value | Description |
| --- | --- |
| 0 | 2.4-GHz band |
| 1 | 5-GHz band |
| 2 | 6-GHz band |

The Supported Bandwidth 532 is a field containing capability information indicating the bandwidth supported by the apparatus, which is the communication apparatus 102 or 103, transmitted the element in the frequency band indicated by the Band ID 531. The bandwidth indicated here is information indicating the bandwidth to be supported per link in a case where the apparatus transmitted the element performs multi-link communication in the frequency band indicated by the Band ID 531. Table 3 illustrates an example of a correspondence between values of the Supported Bandwidth 532 and descriptions indicated by the values. For example, in a case where the Supported Bandwidth 532 contains a value of 0, the bandwidth supported by the apparatus transmitted the element in the frequency band indicated by the Band ID 531 is 20 MHz. In a case where the value of the Supported Bandwidth 532 is 1 or greater, the apparatus transmitted the element can support any bandwidth narrower than or equal to that value in establishing a link in multi-link communication. For example, in a case where the Supported Bandwidth 532 has a value of 2, the apparatus transmitted the element supports all of 20 MHz, 40 MHz, and 80 MHz as link bandwidths. The communication apparatuses 102 and 103 each may support some bandwidths different between communication using only one link and multi-link communication. For example, the communication apparatuses 102 and 103 may support a bandwidth of 80 MHz at the 5-GHz band in communication using only one link, and support a bandwidth of 20 MHz in multi-link communication. The correspondence between the values of the Supported Bandwidth 532 and the indicated descriptions is not limited thereto. The number of bits of the Supported Bandwidth 532 may be increased so that a greater number of band widths can be indicated.

TABLE 3

| Value | Description |
| --- | --- |
| 0 | 20-MHz width |
| 1 | 40-MHz width |
| 2 | 80-MHz width |
| 3 | 160-MHz width |
| 4 | 240-MHz width |
| 5 | 320-MHz width |

In a case where the multi-link capability element expresses operation information, this field may indicate the bandwidth to be actually used in multi-link communication. For example, in a case where the communication apparatus 102 serving as the AP transmits an Association Response including the element, this field contains information indicating the bandwidth of the link(s) established by exchanging the Association Response. For example, in a case where the communication apparatuses 102 and 103 establish a link having a bandwidth of 40 MHz at the 2.4-GHz band, the value of the Supported Bandwidth 532 is 1.

In a case where the multi-link capability element expresses request information, this field may indicate the bandwidth requested to be used in multi-link communication. In a case where the communication apparatus 103 serving as the STA transmits an Association Request including the element, this field indicates the bandwidth to be requested from the communication apparatus 103 to the communication apparatus 102. Even in a case where the element expresses operation information or request information, this field may contain capability information indicating the bandwidth supported by the apparatus transmitted the element in multi-link communication.

The Supported CH 533 is a field containing capability information indicating the channel supported by the apparatus, which is the communication apparatus 102 or 103, transmitted the element in the frequency band indicated by the Band ID 531. The channel indicated here is information indicating the channel where the apparatus transmitted the element supports multi-link communication in the frequency band indicated by the Band ID 531. Table 4 illustrating an example of a correspondence between the bits of the Supported CH 533 and the channels indicated by the bits. For example, in a case where a bit has a value of 0, it indicates not supporting the channel indicated by the bit by the apparatus transmitted the element. In a case where a bit has a value of 1, it indicates supporting the channel indicated by the bit by the apparatus transmitted the element. For example, in a case where the Supported CH 533 contains a value of 0000010010100, it indicates supporting multi-link communication on 3 ch, 5 ch, and Bch by the apparatus transmitted the element. Note that the communication apparatuses 102 and 103 each may support channels different between communication using only one link and multi-link communication. For example, the communication apparatuses 102 and 103 may support all of 1 ch to 13 ch in communication using only one link, and support only some of the channels, such as 1 ch and 5 ch, in multi-link communication. The correspondence between the bits of the Supported CH 533 and the descriptions is not limited to that illustrated in Table 4. The number of bits of the Supported CH 533 may be increased so that a greater number of channels can be indicated. For example, while Table 4 illustrates only the channels at the 2.4-GHz as an example, the number of bits may be increased so that channels at the 5-GHz and 6-GHz bands can be indicated by the thirteenth and subsequent bits. Alternatively, in a case where the Band ID 531 contains information indicating the 5-GHz band, the channels at the 5-GHz band may be listed in order from the zeroth bit. Similarly, in a case where the Band ID 531 contains information indicating the 6-GHz, the channels at the 6-GHz may be listed in order from the zeroth bit.

TABLE 4

| Bit | Description |
| --- | --- |
| 0 | 1CH |
| 1 | 2CH |
| 2 | 3CH |
| . . . | . . . |
| 12 | 13CH |

In a case where the multi-link capability element expresses operation information, this field may indicate the channel(s) to be actually used in multi-link communication. For example, in a case where the communication apparatus 102 serving as the AP transmits an Association Response including the element, this field contains information indicating the channel(s) of the link(s) established by exchanging the Association Response. For example, in a case where the communication apparatuses 102 and 103 establish links on 1 ch and 4 ch at the 2.4-GHz band, the Supported CH 533 has a value of 0000000001001.

In a case where the multi-link capability element expresses request information, this field may indicate the channel(s) requested to be used in multi-link communication. For example, in a case where the communication apparatus 103 serving as the STA transmits an Association Request including the element, this field indicates the channel(s) on which the communication apparatus 103 requests to the communication apparatus 102 to establish a link or links. Even in a case where the element expresses operation information or request information, this field may contain capability information indicating the channel(s) supported by the apparatus transmitted the element in multi-link communication.

The Async Mode CH Distance 534 is a field containing capability information indicating a channel distance which is required by the apparatus transmitted the element for the async mode in the frequency band indicated by the Band ID 531. In the async mode, since communications in the respective links is asynchronously performed, communications can interfere with each other if the channels of the links are close to each other. The required distance between the channels of the links to appropriately decode the signals of the respective links varies from one communication apparatus to another. The capability information is thus notified using this field. In a case where the Async Mode CH Distance 534 contains a value of 4, for example, the apparatus transmitted the element requires a channel distance of at least four channels or more in the async mode. In a case where the foregoing Async Mode Support 523 contains information indicating not supporting the async mode, this field may contain a value of 0 or this field may be omitted. In the present exemplary embodiment, the channel distance required in the async mode is indicated for each of the frequency bands indicated by the Band IDs 531. However, this is not restrictive. The channel distance may be information common to all the frequency bands. Specifically, this field may be included in the Common Info 511.

In a case where the multi-link capability element expresses operation information, this field may contain information indicating the channel distance to be actually used in the async mode of multi-link communication. For example, in a case where the communication apparatus 102 serving as the AP transmits an Association Response including the element, this field contains information indicating the channel distance between the plurality of links established by exchanging the Association Response.

In a case where the multi-link capability element expresses request information, this field may contain information indicating the channel distance requested to be used in the async mode of multi-link communication. Information indicating the minimum channel distance supported in the async mode in multi-link communication with the partner apparatus may be included. In a case where the element expresses operation information, this field contains a value greater than or equal to the greater value among the channel distance presented by the communication apparatus 102 as its capability information and the channel distance presented by the communication apparatus 103 as its capability information. In a case where the Async Mode Support 523 contains information indicating not using the async mode, or in a case where the Async Mode Support 523 is omitted, this field may contain a value of 0. Alternatively, this field may be omitted. In a case where the communication apparatus 103 serving as the STA transmits an Association Request including the element, this field indicates the channel distance to be requested from the communication apparatus 103 in the async mode with the communication apparatus 102. In a case where the communication apparatus 103 does not request using of the async mode, this field may contain a value of 0 or be omitted. In a case where the multi-link capability element expresses operation information or request information, this field may be omitted.

The Max link Number 535 is a field containing capability information indicating the maximum number of links supported by the apparatus transmitted the element in multi-link communication in the frequency band indicated by the Band ID 531. In a case where the foregoing Band Combination Info 525 does not contain information indicating supporting multi-link communication using links in the same frequency band, this field may contain a value of 0. Alternatively, this field may be omitted. In the exemplary embodiment, the maximum number of links can be indicated frequency band by frequency band. However, this is not restrictive. The maximum number of links may be indicated as information common to all the frequency bands. Specifically, this field may be included in the Common Info 511.

In a case where the multi-link capability element expresses operation information, this field may indicate the total number of links to be actually used in the frequency band indicated by the Band ID 531 in multi-link communication. For example, in a case where the communication apparatus 102 serving as the AP transmits an Association Response including the element, this field contains information indicating the number of links to be established by exchanging the Association Response, which is one or more. For example, in a case where the communication apparatuses 102 and 103 establish two links at the 2.4-GHz band, this field contains a value of 2.

In a case where the multi-link capability element expresses request information, this field may indicate the total number of links requested to be used in the frequency band indicated by the Band ID 531 in multi-link communication. For example, in a case where the communication apparatus 103 serving as the STA transmits an Association Request including the element, this field indicates the number of links to be requested from the communication apparatus 103 to the communication apparatus 102 to establish. Even in a case where the element expresses operation information or request information, this field may contain capability information indicating the maximum number of links capable of being established by the apparatus transmitted the element in multi-link communication.

The Supported Nss 536 is a field containing capability information indicating the maximum number of (spatial) streams supported by the apparatus transmitted the element in multi-link communication in the frequency band indicated by the Band ID 531. The number of streams indicated by this field is the number of streams in MIMO communication. In a case where the multi-link communication in the frequency band indicated by the Band ID 531 does not support MIMO communication, this field contains a value of 0 or 1, or this field is omitted. In the present exemplary embodiment, the maximum number of streams can be indicated frequency band by frequency band. However, this is not restrictive. The maximum number of streams may be indicated as information common to all the frequency bands. Specifically, this field may be included in the Common Info 511.

In a case where the multi-link capability element expresses operation information, this field may indicate the number of streams to be actually used in the frequency band indicated by the Band ID 531 in multi-link communication. For example, in a case where the communication apparatus 102 serving as the AP transmits an Association Response including the element, this field contains information indicating the number of streams of MIMO communication to be actually performed by exchanging the Association Response. For example, in a case where the communication apparatuses 102 and 103 perform MIMO communication with three streams in a link where multi-link communication is performed at the 2.4-GHz band, this field contains a value of 3. In a case where MIMO communication is not performed, this field may contain a value of 0 or 1, or this field may be omitted.

In a case where the multi-link capability element expresses request information, this field may indicate the number of streams requested to be used in the frequency band indicated by the Band ID 531M multi-link communication. In a case where the communication apparatus 103 serving as the STA transmits an Association Request including the element, this field indicates the number of streams to be requested from the communication apparatus 103 in MIMO communication in multi-link communication. In a case where the communication apparatus 103 does not request MIMO communication, this field may contain a value of 0 or 1, or this field may be omitted. Even in a case where the element expresses operation information or request information, this field may contain capability information indicating the maximum number of streams supported by the apparatus transmitted the element for MIMO communication in multi-link communication.

Each Per Link Info 513 is a field including fields such as a link ID 541, a Band ID 542, a Bandwidth 543, a CH 544, and an Nss 545. In a case where the multi-link capability element expresses capability information, the Per Link Info 513 indicates information about a channel on which the apparatus transmitted the element supports multi-link communication. In such a case, the set of Per Link Infos 513 includes as many Per Link Infos 513 as the number of channels (links) the apparatus transmitted the element supports multi-link communication. In a case where the element expresses capability information and multi-link communication links have already been established, the Per Link Infos 513 indicate information about the already established links. In such a case, the set of Per Link Infos 513 includes as many Per Link Infos 513 as the number of already established links. Moreover, in such a case, links about which information is presented by the communication apparatus 102 using the Per Link Infos 513 are ones already established with at least either the communication apparatus 103 or another communication apparatus. Moreover, in such a case, links about which information is presented by the communication apparatus 103 using the Per Link Infos 513 are ones already established with at least either the communication apparatus 102 or another communication apparatus. Alternatively, in a case where the element expresses capability information, the element does not need to include any Per Link Info 513. This is not restrictive in a case where the multi-link capability element expresses operation information and the communication apparatus 102 serving as the AP transmits an Association Response including the element. In such a case, the Per Link Infos 513 indicate information about the links to be established by exchanging the Association Response. In such a case, as many Per Link Infos 513 as the number of links to be established by exchanging the Association Response are included. In a case where the communication apparatus 103 presents request information by transmitting an Association Request including the element, the Per Link Infos 513 indicate information about the links that the communication apparatus 103 requests to establish. In such a case, as many Per Link Infos 513 as the number of links that the communication apparatus 103 requests to establish are included.

The link ID 541 is a field containing an identifier for identifying a link.

The Band ID 542 is a field containing information indicating the frequency band to which the link indicated by the link ID 541 belongs. This field is expressed in a similar manner to the Band ID 531.

The Bandwidth 543 is a field containing information indicating the bandwidth of the link indicated by the link ID 541. This field is expressed in a similar manner to the Supported Bandwidth 532. In a case where the multi-link capability element expresses capability information, this field indicates the bandwidth supported by the link indicated by the link ID 541. In a case where the communication apparatus 102 serving as the AP presents operation information by transmitting an Association Response including the element, this field indicates the bandwidth to be used in the link indicated by the link ID 541. In a case where the communication apparatus 103 serving as the STA presents request information by transmitting an Association Request including the element, this field indicates the bandwidth to be requested by the communication apparatus 103 in the link indicated by the link ID 541.

The CH 544 is a field containing information indicating the frequency channel of the link indicated by the link ID 541. This field may contain the number itself that represents the channel. Alternatively, the channel may be represented as in Table 4. In a case where the multi-link capability element expresses capability information, this field indicates the channel supported in the link indicated by the link ID 541. In a case where the communication apparatus 102 serving as the AP presents operation information by transmitting an Association Response including the element, this field indicates the channel to be used in the link indicated by the link ID 541. In a case where the communication apparatus 103 serving as the STA presents request information by transmitting an Association Request including the element, this field indicates the channel to be requested by the communication apparatus 103 in the link indicated by the link ID 541.

The Nss 545 is a field containing information indicating the number of MIMO communication streams in the link indicated by the link ID 541. In a case where MIMO communication is not performed, this field may contain a value of 0 or 1, or this field may be omitted. In a case where the multi-link capability element expresses capability information, this field indicates the maximum number of streams supported in the link indicated by the link ID 541. In a case where the communication apparatus 102 serving as the AP presents operation information by transmitting an Association Response including the element, this field indicates the number of streams to be used in the link indicated by the link ID 541. In a case where the communication apparatus 103 presents request information by transmission an Association Request including the element, this field indicates the number of streams to be requested by the communication apparatus 103 in the link indicated by the link ID 541.

By transmitting and receiving MAC frames including the foregoing multi-link capability element, the communication apparatuses 102 and 103 exchange multi-link communication capability information, operation information, and request information. In the present exemplary embodiment, multi-link communication capability information, operation information, and request information are expressed by the same multi-link capability element. However, this is not restrictive. Capability information and operation information, or capability information and request information, may be expressed by information elements different from each other. In such a case, capability information may be expressed by an element including the Common Info 511 and the Per Band Infos 512, for example. Operation information and request information may be expressed by an element including the Common Info 511 and the Per Link Infos 513. In a case where the multi-link capability element expresses capability information, some of the fields may express operation information or request information. Alternatively, in a case where the multi-link capability element expresses operation information or request information, some of the fields may express capability information.

The multi-link capability element illustrated in FIG. 5 includes fields, such as the Primary CH 521, the Supported CH 533, and CH 544, as information indicating frequency channels. However, this is not restrictive, and the multi-link capability element may include at least any one of the Primary CH 521, the Supported CH 533, and the CH 544 as information indicating a frequency channel.

The names of the fields, the number of fields, and the order of the fields are not limited to those illustrated in FIG. 5. Any field may be included before or after a given one of the fields illustrated in FIG. 5. The fields included in the Common Info 511 may be included in the Per Band Infos 512 or the Per Link Infos 513. Similarly, the fields included in the Per Band Infos 512 or the Per Link Infos 513 may be included in the other or in the Common Info 511. Any of the fields illustrated FIG. 5 may be omitted.

Figure 6:
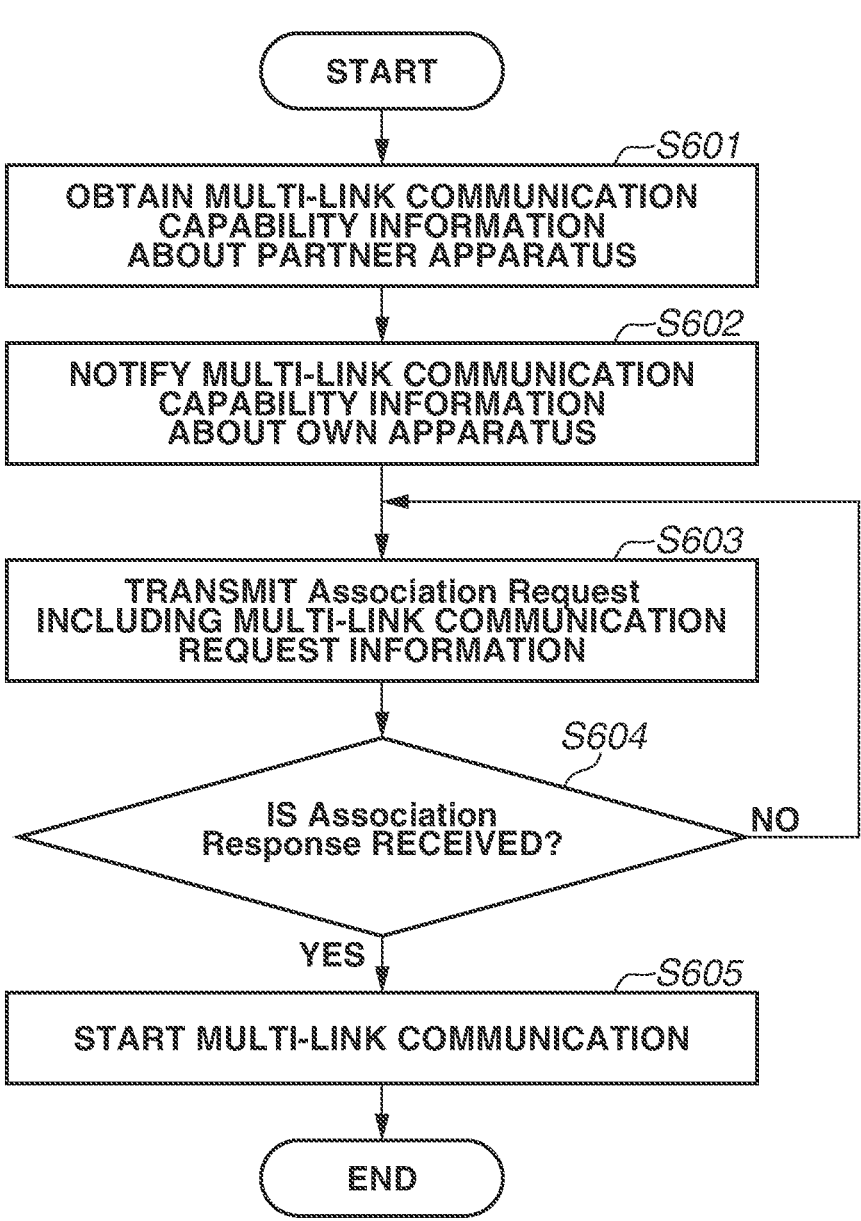
FIG. 6 is a flowchart illustrating processing executed by the communication apparatus 103 in performing multi-link communication.

FIG. 6 is a flowchart illustrating processing performed by the control unit 202 reading the computer program stored in the storage unit 201 and executing the computer program when the communication apparatus 103 performs multi-link communication.

This flowchart is started in response to the power-on of the communication apparatus 103. Alternatively, the communication apparatus 103 may start this flowchart in response to an instruction issued from the user or an application to start multi-link communication. Alternatively, the communication apparatus 103 may start this flowchart when the data amount of data to be transmitted to the communication apparatus 102 reaches or exceeds a predetermined threshold.

In step S601, the communication apparatus 103 initially obtains multi-link communication capability information about the partner apparatus. Specifically, the communication apparatus 103 obtains the capability information about the communication apparatus 102 by receiving a Beacon including the multi-link capability element, transmitted from the communication apparatus 102. Alternatively, the communication apparatus 103 may perform the processing of this step by receiving a Probe Response including the multi-link capability element, transmitted from the communication apparatus 102. In such a case, this step and step S602 described below are reversed in order.

In step S602, the communication apparatus 103 notifies the multi-link communication capability information about the own apparatus. Specifically, the communication apparatus 103 notifies the multi-link capability information about the own apparatus by transmitting a Probe Request including the multi-link capability element. In a case where the capability information about the partner apparatus is obtained before this step, the communication apparatus 103 may determine the capability information for the own apparatus to be notified, based on the capability information about the partner apparatus. Specifically, the communication apparatus 103 may determine the capability information to be notified in this step within the extent not exceeding the capabilities of the communication apparatus 102. For example, in a case where the communication apparatus 103 supports multi-link communication at the 2.4-GHz, 5-GHz, and 6-GHz bands, and the communication apparatus 102 supports multi-link communication only at the 2.4-GHz and 5-GHz bands, the communication apparatus 103 notifies in this step that multi-link communication at the 2.4-GHz and 5-GHz bands is supported, as the capability information. Note that in a case where the communication apparatus 103 transmits an Association Request including request information indicating a multi-link communication-related request to the communication apparatus 102 in step S603 to be described below, the processing of this step may be omitted.

In step S603, the communication apparatus 103 transmits an Association Request including multi-link communication request information. The request information transmitted in this step indicates information about the multi-link communication that the communication apparatus 103 requests to perform. In this step, the communication apparatus 103 may transmit an Association Request not including request information.

In step S604, the communication apparatus 103 determines whether an Association Response is received from the communication apparatus 102 serving as the AP. If Association Response is not received (NO in step S604), the communication apparatus 103 performs the processing of this step again. In a case where a predetermined time has elapsed since the transmission of the Association Request in step S603 and a YES determination is not performed in this step, the communication apparatus 103 notifies the user of an error. The processing of this procedure ends. On the other hand, in a case where an Association Response is received (YES in step S604), the communication apparatus 103 performs the processing of step S605.

In step S605, the communication apparatus 103 starts multi-link communication with the communication apparatus 102. In a case where the Association Response received in step S604 includes multi-link communication operation information, the communication apparatus 103 starts multi-link communication based on the operation information. In a case where the request information is transmitted in step S603 and an Association Response including only information indicating permission is received in step S604, the communication apparatus 103 starts multi-link communication based on the request information transmitted in step S603. After the processing of step S605 is performed, the processing of this procedure ends.

Figure 7:
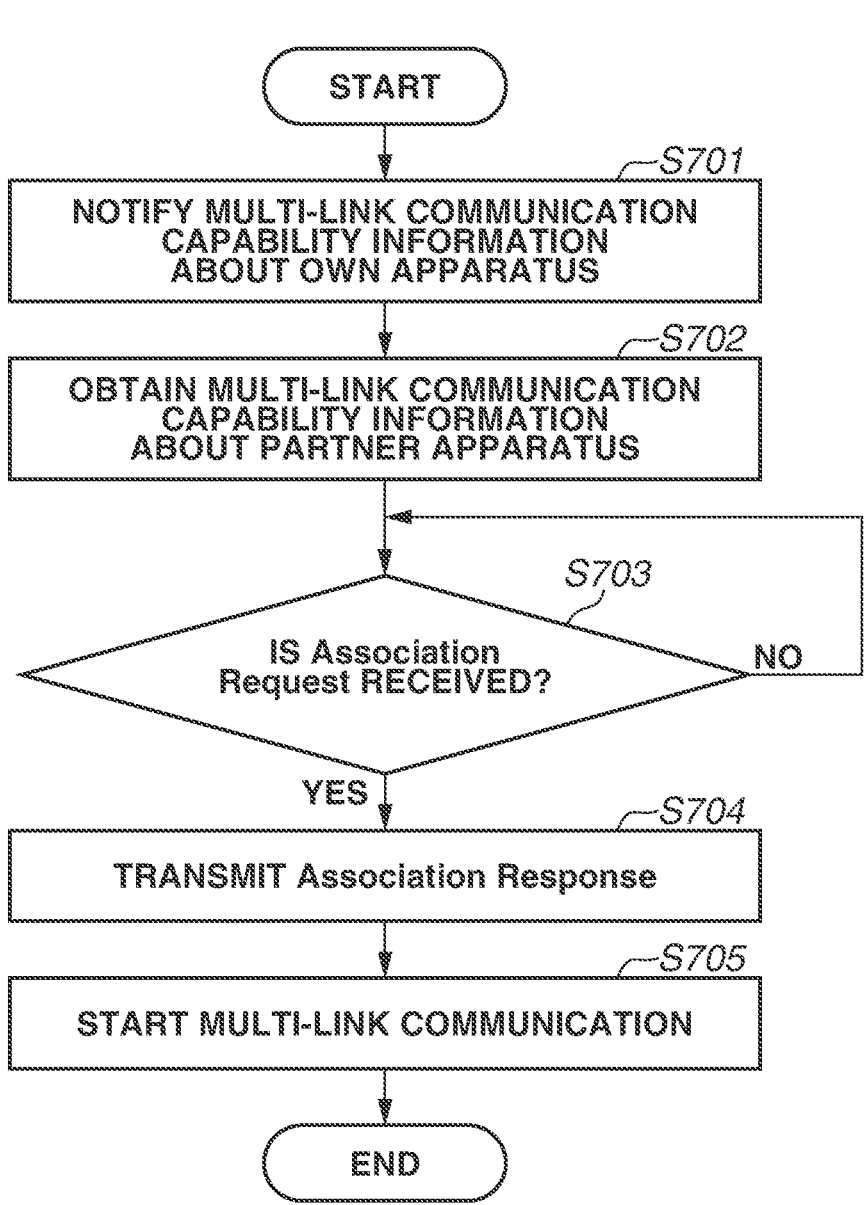
FIG. 7 is a flowchart illustrating processing executed by the communication apparatus 102 in performing multi-link communication.

FIG. 7 is a flowchart illustrating processing performed by the control unit 202 reading the computer program stored in the storage unit 201 and executing the computer program when the communication apparatus 102 performs multi-link communication.

This flowchart is started in response to the power-on of the communication apparatus 102. Alternatively, the communication apparatus 102 may start this flowchart in response to an instruction issued from the user or an application to start multi-link communication. Alternatively, the communication apparatus 102 may start this flowchart in response to the data amount of data to be transmitted to the communication apparatus 103 reaching or exceeding a predetermined threshold.

In step S701, the communication apparatus 102 initially notifies the multi-link communication capability information about the own apparatus. Specifically, the communication apparatus 102 notifies the multi-link communication capability information about the own apparatus by transmitting a Beacon including the multi-link capability element. Alternatively, the communication apparatus 102 may perform the processing of this step by transmitting a Probe Response including the multi-link capability element in response to a Probe Response received from the communication apparatus 103. In such a case, this step and step S702 described below are reversed in order.

In step S702, the communication apparatus 102 obtains multi-link communication capability information about the partner apparatus. Specifically, the communication apparatus 102 obtains the multi-link communication capability information about the partner apparatus by receiving a Probe Request including the multi-link capability element. In a case where Probe Request including the multi-link capability element is not received from the partner apparatus, the processing of this step may be omitted.

In response to the Probe Request received from the communication apparatus 103, the communication apparatus 102 returns a Probe Response as a response. Here, in a case where a Beacon including the multi-link capability element has been transmitted, the Probe Response does not need to include the multi-link capability element.

In step S703, the communication apparatus 102 determines whether an Association Request is received from the communication apparatus 103. In a case where Association Request is not received (NO in step S703), the communication apparatus 102 performs the processing of this step again. In a case where a predetermined time has elapsed since the transmission of the Probe Response in step S702 and a YES determination is not performed in step S703, the communication apparatus 102 notifies the user of an error, and the processing of this procedure ends. On the other hand, in a case where an Association Request is received (YES in step S703), the communication apparatus 102 performs the processing of step S704.

In step S704, the communication apparatus 102 transmits an Association Response as a response to the Association Request. In a case where request information is not received from the communication apparatus 103 in step S703, the communication apparatus 102 transmits an Association Response including operation information about the multi-link communication with the communication apparatus 103. Here, the communication apparatus 102 determines what operation information to be included in the Association Response, based on the multi-link communication capability information about the communication apparatus 103. The operation information to be included in the Association Response from the communication apparatus 102 indicates information about the multi-link communication to be actually performed between the communication apparatuses 102 and 103. Note that the communication apparatus 102 may transmit an Association Response including operation information even in a case where the Association Request received in step S703 includes request information from the communication apparatus 103. In such a case, the communication apparatus 102 determines what operation information to be included in the Association Response, based on the request information contained in the Association Request received from the communication apparatus 103. Alternatively, in a case where request information is received from the communication apparatus 103 in step S703, the communication apparatus 102 may transmit an Association Response including only information indicating whether to permit multi-link communication.

In step S705, the communication apparatus 102 starts multi-link communication with the communication apparatus 103. In a case where the Association Response transmitted in step S704 includes multi-link communication operation information, the communication apparatus 102 starts multi-link communication based on the operation information. In a case where request information is received in step S703 and an Association Response including only information indicating permission is transmitted in step S704, the communication apparatus 102 starts multi-link communication based on the request information received in step S703. After the processing of step S705 is performed, the processing of this procedure ends.

As described above, the communication apparatuses 102 and 103 add the element indicating multi-link communication capability information to the MAC frames, whereby multi-link communication factoring in each other's capabilities can be performed.

At least a part or all of the flowcharts of the communication apparatuses 102 and 103 illustrated in FIGS. 6 and 7 may be implemented by hardware. For example, by using a predetermined complier, a dedicated circuit may be generated on a field programmable gate array (FPGA) from the computer programs for implementing the steps, and the dedicated circuit is used for hardware implementation. Like an FPGA, a gate array circuit may be formed for hardware implementation. An application specific integrated circuit (ASIC) may be used for implementation.

The present invention can also be implemented by processing for supplying a program for implementing one or more functions of the foregoing exemplary embodiment to a system or an apparatus via a network or a storage medium, and reading and executing the program by one or more processors in a computer of the system or apparatus. A circuit for implementing one or more functions (such as an ASIC) can also be used for implementation.

The present invention is not limited to the foregoing exemplary embodiment, and various changes and modifications can be made without departing from the spirit and scope of the present invention. The following claims are thus attached to make the scope of the present invention public.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, information about communication via a plurality of links compliant with the IEEE 802.11 series standard to be established with the partner apparatus on a plurality of different frequency channels can be communicated using an appropriate MAC frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
at least one memory that stores a set of instructions; and
at least one processor that executes the instructions, the instructions, when executed, causing the communication apparatus to perform operations comprising:
communicating an Association Request frame compliant with an Institute of Electrical and Electronics Engineers (IEEE) 802.11 series standard with another communication apparatus; and
establishing connection including a plurality of links through exchanging of the Association Request frame and an Association Response frame, which is a response to the Association Request frame, with the another communication apparatus,
wherein Association Request frame communicated by the communicating includes a Multi-Link element, the Multi-Link element includes a Link Info field, the Link Info field includes information indicating a Link ID and information indicating a frequency channel as information related to communications via the plurality of links, and the information indicating the frequency channel indicates a channel that the communication apparatus supports on a Link corresponding to the Link ID.

2. The communication apparatus according to claim 1, wherein the Multi-Link element further includes third information corresponding to a frequency band, and the third information indicates a plurality of channels that the communication apparatus supports in the frequency band.

3. The communication apparatus according to claim 1, wherein the Association Request frame further includes information indicating a bandwidth that is supported by the apparatus transmitted the Association Request frame in the communications via the plurality of links.

4. The communication apparatus according to claim 1, wherein the Association Request frame further includes information indicating whether the apparatus transmitted the Association Request frame supports, in the communications in the plurality of links, a first mode in which the communications via the plurality of links are synchronously performed.

5. The communication apparatus according to claim 1, wherein the Association Request frame further includes information indicating whether the apparatus transmitted the Association Request frame supports, in the communications in the plurality of links, a second mode in which the communications via the plurality of links are asynchronously performed.

6. The communication apparatus according to claim 5, wherein, in a case where the information indicating supporting of the second mode is included, the Association Request frame further includes information indicating a distance between frequency channels that are supported by the apparatus transmitted the wireless frame in the second mode.

7. The communication apparatus according to claim 1, wherein the Association Request frame further includes information indicating a maximum number of links that can be established in the communications via the plurality of links by the apparatus transmitted the Association Request frame.

8. The communication apparatus according to claim 1, wherein the instructions further cause the communication apparatus to:
transmit, in a case where the communication unit apparatus transmits the Association Request frame to the another communication apparatus, Probe Request frame including information indicating a frequency channel, among the plurality of frequency channels where the wireless communication compliant with the IEEE 802.11 series standard can be performed, to be used in the communications via the plurality of links with the another communication apparatus; and establish a link for performing the communications via the plurality of links with the another communication apparatus using the frequency channel indicated by the information, indicating frequency channel, included in the another wireless frame transmitted.

9. The communication apparatus according to claim 1, wherein the Association Request frame further includes information indicating a bandwidth of a link to be established in the communications via the plurality of links by the apparatus transmitted the Association Request frame.

10. The communication apparatus according to claim 1, wherein the Association Request frame further includes information indicating whether a first mode in which the communications in the plurality of links are performed synchronously is used in the communications via the plurality of links between the communication apparatus and the another communication apparatus.

11. The communication apparatus according to claim 1, wherein the Association Request frame further includes information indicating whether a second mode in which the communications in the plurality of links are performed asynchronously is used in the communications via the plurality of links between the communication apparatus and the another communication apparatus.

12. The communication apparatus according to claim 1, wherein the instructions further cause the communication apparatus to generate the Association Request frame.

13. The communication apparatus according to claim 1, wherein the instructions further cause the communication apparatus to perform operations comprising:

receiving a Beacon frame that includes a Multi-Link element;

transmitting a Probe Request frame that includes a Multi-Link element;

receiving a Probe Response frame that includes a Multi-Link element and is a response to the Probe Request frame;

wherein the Association Request frame includes the Multi Link element that the Probe Response frame includes, receiving the Association Response frame that is a response to the Association Request frame, wherein, after communicating the Beacon frame that includes the Multi-Link element, the Probe Request frame that includes the Multi-Link element, the Probe Response frame that includes the Multi-Link element, the Association Request frame that includes the Multi-Link element, and the Association Response frame that includes the Multi-Link element with the another communication apparatus via a first frequency channel, the plurality of links that includes a first link via the first frequency channel and a second link via a second frequency channel is established.

14. A communication method comprising:

communicating an Association Request frame compliant with an IEEE 802.11 series standard with another communication apparatus; and establishing connection including a plurality of links through exchanging of the Association Request frame and an Association Response frame, which is a response to the Association Request frame, with the another communication apparatus, wherein the Association Request frame communicated by the communicating includes a Multi-Link element, the Multi-Link element includes a Link Info field, the Link Info field includes information indicating a Link ID and information indicating a frequency channel as information related to communications via the plurality of links, and the information indicating the frequency channel indicates a channel that the communication apparatus supports on a Link ID.

15. A non-transitory computer-readable storage medium storing a program that causes a computer to function as:

communicating an Association Request frame compliant with an Institute of Electrical and Electronics Engineers (IEEE) 802.11 series standard with another communication apparatus; and establishing connection including a plurality of links through exchanging of the Association Request frame and an Association Response frame, which is a response to the Association Request frame, with the another communication apparatus, wherein the Association Request frame communicated by the communicating includes a Multi-Link element, the Multi-Link element includes a Link Info field, the Link Info field includes information indicating a Link ID and information indicating a frequency channel as information related to communications via the plurality of links, and the information indicating the frequency channel indicates a channel that the communication apparatus supports on a Link corresponding to the Link ID.

* * * * *